J. ROBERTSON.
CONCRETE HOG TROUGH AND VALVE.
APPLICATION FILED NOV. 4, 1908.
925,948.
Patented June 22, 1909.
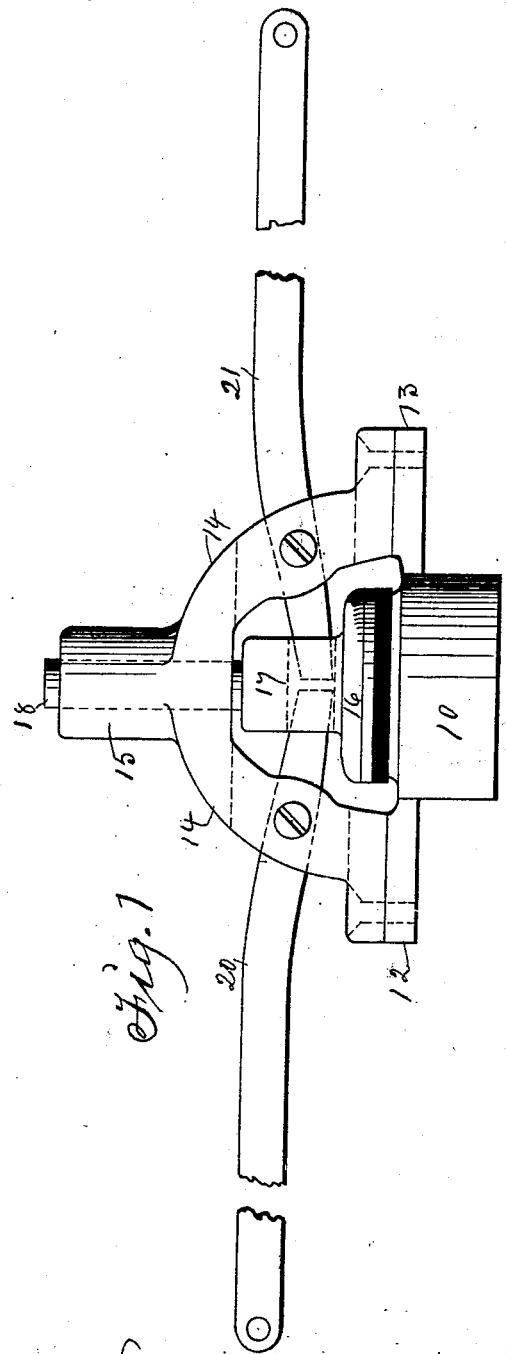
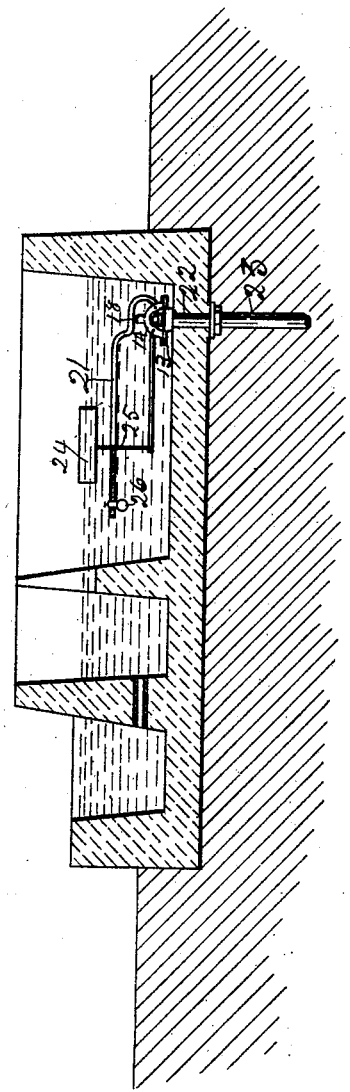

UNITED STATES PATENT OFFICE.

JEREMY ROBERTSON, OF SHELBY, IOWA.

CONCRETE HOG-TROUGH AND VALVE.

No. 925,948.   Specification of Letters Patent.   Patented June 22, 1909.

Application filed November 4, 1908. Serial No. 461,087.

*To all whom it may concern:*

Be it known that I, JEREMY ROBERTSON, a citizen of the United States, residing at Shelby, in the county of Shelby and State of Iowa, have invented a new and useful Concrete Hog-Trough and Valve, of which the following is a specification.

My invention relates to a hog trough as set forth in my application for a patent for a mold for making concrete hog troughs complete in one piece, filed June 25, 1908, No. 440,759 and consists in an automatic valve specially adapted to resist pressure of water from a source of supply, as hereinafter set forth, pointed out in my claims and illustrated in the accompanying drawing, in which:

Figure 1 is a side view of the valve mounted in a bearer adapted to be fixed to the end of a supply pipe fixed in the bottom of a trough. Fig. 2 is a longitudinal section of the trough and shows the valve applied thereto as required for practical use.

The numeral 10 designates the valve seat provided with integral lateral extensions 12 and 13 to which is fixed, by means of screws, as indicated by dotted lines, an arch 14 that has a tubular vertical extension 15 at its center as clearly shown in Fig. 1.

A valve 16 has an integral extension 17 at its top that terminates in a stem 18 and extends up through a bearing in the top 15 of the arch 14.

To one side of the arch 14 is fulcrumed a lever 20 in such a manner that the end of its short arm extends into a slot in the valve extension 17 as required for raising and lowering the valve 16, and to the other side of the arch is fulcrumed a corresponding lever 21 to be operated on the valve for the same purpose but in a different manner as shown in Fig. 2.

A section of pipe 22, is embedded in the bottom of the supply chamber of the trough and connected with a supply pipe 23, as shown in Fig. 2.

To the lever 20 a float 24 is pivotally connected by a rigid stem 25 fixed to the float in such a manner that when the float is elevated by water into position as shown by a supply of water as indicated by dotted lines to represent the water the lever 20 will be actuated by the lifting force of the float as required for combining the force of the float and the lever for closing the valve and resisting the pressure of water in the supply pipe 23 as required to retain the valve closed until enough water in the trough is drawn out and the float allowed to descend and allow the pressure in the supply pipe 23 to open the valve 16 to allow another supply of water to be thus automatically admitted into the trough.

In some instances the pressure in the supply pipe 23 may be greater than the combined force of the float and the lever 20 connected therewith and the lever 21 is therefore provided to which may be added a second float for increasing force on the downward pressure on the valve 16 and regulating the pressure required to resist and overcome the upward pressure against the valve by which the source of supply conveys water and force through the supply pipe 23.

For regulating the force of the lever 21 as applied and shown in Fig. 2 the free end portion of said lever is provided with a scale and a weight 26 adjustably and detachably connected therewith as required for meeting the resistance necessary for keeping the valve closed and the water supply cut off when not needed.

Having thus set forth the purposes of my invention and the manner of its construction, application and use the practical operation and advantages thereof will be obvious.

What I claim as new and desire to secure by Letters-Patent, is:

1. A valve seat having lateral extensions, an arched bearer fixed to said extensions and provided with a bearing at its top for a valve stem, a valve having an enlargement at its top provided with a slot to admit the ends of levers, levers fulcrumed to the arched bearer to extend into the slot in said enlargement on top of the valve and a valve stem integral with said enlargement extended up through said bearing, arranged and combined to operate as set forth.

2. A valve seat having lateral extensions, an arched bearer fixed to said extensions and provided with a bearing at its top for a valve stem, a valve having an enlargement at its top provided with a slot to admit the ends of levers, levers fulcrumed to the arched bearer to extend into the slot in said enlargement on top of the valve and a valve stem integral with said enlargement extended up through said bearing, a trough having a fixed supply pipe in its bottom, a float pivotally connected with one of said levers and an adjustable weight on the other lever, arranged and combined to operate as set forth.

JEREMY ROBERTSON.

Witnesses:
    M. E. CLAPP,
    G. H. RINK.